United States Patent [19]

Rice

[11] 4,419,136
[45] Dec. 6, 1983

[54] EXPANSIVE CEMENT

[76] Inventor: Edward K. Rice, 2077 Linda Flora Dr., Los Angeles, Calif. 90024

[21] Appl. No.: 347,560

[22] Filed: Feb. 10, 1982

[51] Int. Cl.$^3$ .............................................. C04B 7/35
[52] U.S. Cl. ..................................... 106/89; 106/104; 106/314
[58] Field of Search .................... 106/89, 104, 97, 314

[56] References Cited

U.S. PATENT DOCUMENTS

| 3,155,526 | 11/1964 | Klein | 106/89 |
| 3,251,701 | 5/1966 | Klein | 106/89 |
| 3,857,714 | 12/1974 | Mehta | 106/89 |

OTHER PUBLICATIONS

Construction Technology Laboratories Report to Department of Energy Entitled "Energy Conservation Potential of Portland Cement Particle Size and Distribution, Final Report" dated Mar., 1979.

Primary Examiner—James Poer
Attorney, Agent, or Firm—Lyon & Lyon

[57] ABSTRACT

An improved expansive cement and method of forming same. An expansive clinker containing a stable calcium alumino sulfate compound is separately ground to a selected surface area greater than about 4600 sq. cm/gm. The ground expansive clinker is then blended with a ground cement clinker and with gypsum to form the expansive cement. The expansive cement formed in accordance with the present invention requires less of the expansive clinker than expansive cements known in the art to achieve the same magnitude of expansion.

14 Claims, No Drawings

EXPANSIVE CEMENT

BACKGROUND OF THE INVENTION

1. Field of the Invention

The present invention is directed to an improved expansive cement and method of forming same. More specifically, the expansive cement of the present invention is formed by finely grinding an expansive clinker which includes a stable calcium alumino sulfate compound, and then blending an amount of the expansive clinker determined by the proportion of the calcium alumino sulfate compound therein with a separately ground cement clinker and gypsum to form an expansive cement composition.

2. Description of the Prior Art

Typical cements, such as a Portland cement, are generally comprised of discrete particles of a cement clinker and gypsum. Such cements, however, undergo an undesirable shrinkage as the cement sets and hardens. This shrinking is disadvantageous because, among other reasons, cracks tend to form in the hardened cement under conditions of restraint with the passage of time. Consequently, expansive clinkers are known in the art which can be added to the cement clinker for the purpose of producing a cement which will not shrink, that is, no net shrinkage occurs. See, for example, U.S. Pat. Nos. 3,155,526 and 3,251,701, the disclosures of which are hereby incorporated by reference. The addition of an expansive clinker in suitable proportion to the cement clinker can compensate for the normal shrinkage of the cement at least to some degree, if not entirely, as well as produce a net expansion.

Generally, the preparation of an expansive cement includes as the final step combining the discrete particles of the cement clinker with the discrete particles of the expansive clinker in a ball mill and then intergrinding the combined particles until the mixture has a suitable surface area as measured by ASTM C 204, also referred to as the Blaine number. However, when the expansive and cement clinkers are combined for intergrinding, control over the surface area of the expansive clinker is lost. For example, since the cement clinker is generally much harder than the expansive clinker, it is believed that intergrinding the expansive clinker with the cement clinker results in grinding the softer expansive clinker to generally much finer particle sizes than the cement clinker. Since an expansive cement can require up to about 50% more water to hydrate than a non-expansive cement, it is believed that the necessity for the additional water is caused at least in part by the smaller particle size of the expansive clinker. In an attempt to counteract this need for additional water, the prevailing tendency in the industry has been to more coarsely grind the expansive clinker by grinding the combined cement and expansive clinkers more coarsely. Moreover, since an inverse relationship exists between the amount of water added to hydrate a cement and the cohesive strength of the hardened product, the cohesive strength of an expansive cement has generally not been as great as non-expansive cements. This difference in cohesive strengths is undesirable.

In addition, forming the expansive cement by intergrinding the cement clinker and the expansive clinker generally requires at least about 12% by weight of the cement composition to be the expansive clinker, and oftentimes the expansive clinker comprises as much as 30–40% by weight of the cement composition, depending upon the proportion of the calcium alumino sulfate compound in the expansive clinker, in order to obtain a hardened product having the degree of expansion desired as well as the required strength. The amount of the expansive clinker added to form an expansive cement is of concern since the expansive clinker is generally much more expensive than the cement clinker. Consequently, the addition of lesser amounts of the expansive clinker will materially reduce the cost of an expansive cement.

SUMMARY OF THE INVENTION

The present invention provides an expansive cement which is formed by finely grinding an expansive clinker which includes a stable calcium alumino sulfate compound outside the presence of a cement clinker or gypsum, and then blending the expansive clinker with a ground cement clinker, or with a commercial Portland type cement, and gypsum to form the expansive cement composition. The amount of the expansive clinker which is added to form the expansive cement is determined by the proportion of the calcium alumino sulfate compound therein and the degree of expansion desired. By separately grinding the expansive clinker to control its particle size and obtain a selected surface area, the expansive cement composition of the present invention requires considerably smaller amounts of the expansive clinker to provide the same magnitude of expansion and cohesive strength as expansive cements known in the industry. The expansive clinker is ground to a surface area of at least about 4600 sq. cm/gm since expansive cements formed in accordance with the present invention containing an expansive clinker having particle sizes such that the surface area is less than 4600 sq. cm/gm have been found to be unstable per ASTM C 806.

Preferably, the expansive clinker is ground to a surface area or Blaine number of from about 5000 to about 7500 sq. cm/gm and comprises from about 4% to about 9% by weight of the blended expansive cement when the proportion of calcium alumino sulfate therein is about 20 to about 40 percent by weight. The cement clinker or commerical Portland cement preferably has a surface area of from about 3000 to about 6200 sq. cm/gm. Since less of the expansive clinker is used in the expansive cement of the present invention, less gypsum is also required. The ratio of gypsum to the expansive clinker is approximately 1:1, and preferably from about 4 to about 10% gypsum is blended into the preferred expansive cement composition having from about 4% to about 9% by weight of the expansive clinker to provide the correct chemical balance in the blended expansive cement.

Accordingly, it is an object of this invention to provide an expansive cement which has not been formed by intergrinding the cement clinker with the expansive clinker.

It is a further object of this invention to provide an expansive cement by separately grinding the expansive clinker to a fine surface area, and then blending the expansive clinker with a ground cement clinker and gypsum to form the expansive cement composition.

It is another object of this invention to provide an expansive cement which contains less expansive clinker than expansive cements known in the art to achieve the same magnitude of expansion.

The manner in which these and other objects and advantages of the present invention are achieved will become apparent from the detailed description of the invention which follows.

DETAILED DESCRIPTION OF THE INVENTION

In general, the improved expansive cement of the present invention is formed as follows. An expansive clinker which includes a stable calcium alumino sulfate compound is put into a ball mill and is finely ground to a selected surface area greater than about 4600 sq. cm/gm. The expansive clinker is not interground with a cement clinker or gypsum as is the practice in the art, but is separately ground to control its particle size and obtain a selected surface area. After the expansive clinker is removed from the ball mill, it is blended with a ground cement clinker and with gypsum to form the expansive cement composition of the present invention. The amount of the expansive clinker which is blended with the cement clinker and gypsum is determined by the proportion of the calcium alumino sulfate compound therein and the degree of expansion desired. By separately grinding the expansive clinker to control its particle size and surface area, the expansive cement compositions of the present invention require less expansive clinker than expansive cements known in the art to achieve the same magnitude of expansion.

The expansive clinker includes a stable calcium alumino sulfate in the form of a ternary compound $(CaO)_4 (Al_2O_3)_3 (SO_3)$, and is preferably formed as described in U.S. Pat. Nos. 3,155,526 or 3,251,701, the disclosures of which have been incorporated by reference. Although it is desirable that the calcium alumino sulfate compound comprise as large a proportion of the expansive clinker as possible to reduce the amount of expansive clinker required, the present mechanics of manufacturing the expansive clinker generally limit the proportion of the calcium alumino sulfate compound to less than about 40% by weight. As the proportion rises above 40%, the expansive clinker becomes increasingly difficult to handle in the kiln due to its "stickiness". Expansive clinkers containing more than 40% by weight calcium alumino sulfate can be used in the present invention, and would be preferred, if such a clinker can be economically produced.

The proportion of the calcium alumino sulfate compound in the expansive clinker can be calculated as taught by U.S. Pat. No. 3,251,701. Essentially, the percent by weight calcium alumino sulfate is equal to 2.00 times the amount of aluminum oxide minus 2.56 times the amount of ferric oxide. Since the proportion of the calcium alumino sulfate in the expansive clinker varies, the amount of the expansive clinker necessary to provide the required expansion likewise varies. For example, if the proportion of the calcium alumino sulfate compound is about 20 percent by weight, it has been determined that about 6% to about 7% by weight of the expansive clinker should be blended with the cement clinker and gypsum to form an expansive cement composition which meets the requirements of ASTM C 806. In contrast, if the expansive clinker is interground with the cement clinker, about 12% to about 13% percent of the expansive clinker is required to meet the standards of ASTM C 806 when the proportion of calcium alumino sulfate is likewise about 20 percent by weight. Similarly, when the calcium alumino sulfate proportion is about 28 percent by weight, about 5% to about 6% by weight of the expansive clinker is required in the expansive cement composition of the present invention as contrasted with about 10% to about 12% by weight in expansive cements formed by intergrinding. It is believed that a direct relationship exists between the proportion of the calcium alumino sulfate and the percent expansive clinker required to produce the same expansion, although this relationship is not fully understood at this time. The expansive clinker preferably comprises from about 5 to about 7.5 percent by weight of the expansive cement composition, although greater amounts of the expansive clinker may be necessary depending upon the proportion of the calcium alumino sulfate compound therein and the specific use.

The expansive clinker is separately ground to a surface area of at least about 4600 sq. cm/gm. If the particle size of the expansive clinker is such that the surface area is less than 4600 sq. cm/gm, it has been found that the expansive cements so formed continue to expand beyond 115% of the 7 day expansion per ASTM C 806, and are therefore considered to be unstable. The particular surface area selected may vary depending upon the particular use of the expansive cement composition. An expansive cement having high early strength would preferably contain an expansive clinker having a surface area of about 7500 sq. cm/gm. On the other hand, an expansive cement for high temperature applications where rapid setting times occur would preferably contain an expansive clinker having a surface area of about 4800 sq. cm/gm.

The cement clinker may be any Portland or similar type cement which meets the applicable ASTM specifications. A cement clinker may be put into the ball mill after the expansive clinker has been removed, or put into a separate ball mill, and ground to a selected surface area. Preferably, the cement clinker is ground to a surface area of from about 3000 sq. cm/gm to about 6200 sq. cm/gm. The particular surface area of the cement clinker may also vary depending upon the specific use of the expansive cement composition. For example, where high early strength is desired, a surface area of about 5500 has been found to be particularly advantageous. In high temperature applications where rapid setting times occur, a surface area of about 3000 to about 3450 is preferred. Alternately, the expansive clinker may be blended with an already ground Portland-type cement which has a comparable surface area.

Any available gypsum which meets the applicable ASTM standards is suitable. The ratio of gypsum to the expansive clinker and the expansive cement compositions of the present invention is approximately equal to or slightly exceeds 1:1 to obtain the desired setting qualities in the finished concrete. The preferred expansive cement compositions of the present invention which contain from about 4 to about 9 percent by weight of the expansive component also contain from about 4 to about 10 percent by weight gypsum. However, where the ground cement clinker blended with the expansive clinker is an available Portland cement which already contains gypsum, the amount of gypsum contained therein must be taken into account when adding gypsum to form the expansive cement composition of the present invention to insure that all of the gypsum has reacted before the formation of the hydrates.

The expansive clinker, and, if necessary, the cement clinker are ground to their respective selected surface areas in any standard ball mill presently used in the art, e.g., a Denver grinding mill which can be obtained from the Denver Equipment Company in Denver, Colo. The blender used to mix the expansive clinker and the cement clinker after they have been separately ground may be a standard laboratory V-blender, or a blender commonly referred to as a "zig-zag" blender which can be obtained from the Paterson-Kelley Company, P.O. Box 458, East Stroudsburg, Pa. 10831. A zig-zag blender suitable for a particular purpose can be custom-built by the Paterson-Kelley Company by specifying the desired particle size distribution, the density of the particles, and the desired through-put (tons/hr).

The concrete formed from the expansive cement composition of the present invention has superior workability (less slump loss) and less surface bleeding due, at least in part, to the necessity for the addition of less water, and has greater early expansion within the first 7 days per ASTM C 806. It is believed that these improved properties are the result of controlling the particle size of the expansive clinker by separately grinding the expansive clinker before it is blended with a cement clinker or a commercial Portland cement to form the expansive cement composition. In contrast, when the expansive clinker is interground with a cement clinker, the particle sizes of the expansive clinker apparently vary from the very fine to the very coarse due to the harder particles of the expansive clinker, and the lack of control over the expansive clinker particles. As it is known that the finer particles of a clinker hydrate first, it appears that the very fine expansive clinkers particles, i.e., those having a surface area in excess of 7500 sq. cm/gm, may actually be hydrating while still in the concrete mixer. Consequently, the beneficial expansion potential of these particles is lost. Similarly, it appears that the very coarse particles of the expansive clinker, e.g., those having a surface area less than about 4600 sq. cm/gm. do not contribute to the required expansion under the ASTM C 806 because they do not hydrate within the first 7 days. Consequently, their complete expansion potential is also lost because the concrete tends to become too stiff to permit complete expansion after this point in time. Similarly, it has been found that if the expansive clinker has a surface area less than about 4600 sq. cm/gm, the 28-day expansion exceeds 115% of the 7-day expansion per ASTM C 806, and such a cement is considered unstable. By separately grinding the expansive clinker to a selected surface area greater than about 4600 sq. cm/gm, considerably lesser amounts of the expansive clinker are required to achieve the same magnitude of expansion, thereby materially decreasing the cost of an expansion cement in accordance with the present invention.

To further illustrate the practice and advantages of the present invention, a series of tests were conducted to determine the effect of the Blaine surface area on expansion and strength as measured by the appropriate ASTM standards. Each of the expansive cement compositions were formed by blending 6¼% by weight of a separately ground expansive clinker containing 28% calcium alumino sulfate compound with 87½% by weight of a typical Portland cement, e.g. Southwestern Type II, and with 6¼% by weight of Terra Alba gypsum from U.S. Gypsum Co. The following results were obtained:

TABLE I

| CEMENT NO. | 1 | 2 | 3 | 4 | 5 |
|---|---|---|---|---|---|
| expansive clinker, Blaine | 3113 | 3113 | 6351 | 7785 | 7785 |
| cement clinker, Blaine | 3980 | 6020 | 3980 | 3980 | 6020 |
| Restrained Expansion of |  |  |  |  |  |
| Mortor, average % of expansion (ASTM C 806) water cure, days |  |  |  |  |  |
| 7 | .036 | .028 | .050 | .046 | .041 |
| 28 | .046 | .038 | .050 | .044 | .044 |
| Cube Compressure Strength p.s.i. (ASTM C 109 Modified) Days |  |  |  |  |  |
| 3 | 1980 | 3120 | 2350 | 2450 | 3360 |
| 7 | 2520 | 3580 | 3440 | 3620 | 4510 |
| 28 | 4700 | 5570 | 5800 | 4900 | 5330 |

The standards set forth in ASTM C 845-80 provide that expansion at 7 days must be at least 0.04% minimum but no more than 0.10% maximum, and the 28-day expansion is to be a maximum of 115% of the 7-day expansion. This section further provides that the 7-day strength must be at least 2100 p.s.i. while the 28-day strength must be at least 3500 p.s.i. Thus, as can be seen by a review of the above results when compared with the standards of ASTM C 845-80, all of the expansive cement compositions passed the requisite strength minimums with better than average results, but expansive cement compositions 1 and 2 which include an expansive clinker having a surface area of less than 4600 Blaine failed the expansion requirement. It is of particular significance to note that expansive cement composition 3 not only had good expansion, but also has superior 28-day strength.

Additional tests were also conducted comparing expansive cements formed in accordance with the present invention with expansive cements formed by intergrinding the expansive clinker with the cement clinker. Expansive cement compositions 11 and 12 were each formed by intergrinding the same expansive clinker containing 28% calcium alumino sulfate compound with a typical Type I cement clinker, the two different clinkers being obtained from two different plants of the same company. Expansive cement compositions 13 and 14 were formed by blending the same expansive clinker containing 28% calcium alumino sulfate which had been separately ground to 6367 Blaine with typical Portland cements having 3797 blaine and 3993 blaine, respectfully. All of the expansive cement compositions had approximately a 1:1 ratio of gypsum to expansive clinker. As shown in Table II below, both of the interground expansive cements required approximately twice as much of the expansive clinker to achieve relatively the same expansion. Moreover, the blended compositions in accordance with the present invention had significantly better strengths.

TABLE II

| CEMENT NO. | 11 | 12 | 13 | 14 |
|---|---|---|---|---|
| interground mixture, Blaine | 4023 | 4070 | — | — |
| expansive clinker, Blaine | — | — | 6367 | 6367 |
| cement clinker, Blaine | — | — | 3797 | 3993 |
| % calcium alumino sulfate | 28 | 28 | 28 | 28 |
| % expansive clinker | 12 | 12 | 5.75 | 6 |
| Average % expansion (ASTM C 806) |  |  |  |  |
| 7 day | 0.041 | 0.048 | 0.046 | 0.054 |
| 28 day | 0.045 | 0.052 | 0.047 | 0.054 |
| Cube Compression Strength p.s.i. (ASTM C 109 modified) |  |  |  |  |
| 7 day | 3150 | 2670 | 4445 | 4388 |

TABLE II-continued

| CEMENT NO. | 11 | 12 | 13 | 14 |
|---|---|---|---|---|
| 28 day | 5310 | 5020 | 6220 | 6043 |

While the preferred application of this invention has been shown and described, it would be apparent to those skilled in the art that many more modifications are possible without departing from the inventive concept herein described. The invention, therefore, is to be limited only by the lawful scope of the claims which follow.

What is claimed is:

1. A method of forming an improved expansive cement comprising:
   separately grinding an expansive clinker containing a stable calcium alumino sulfate compound to a controlled particle size having a selected surface area greater than about 4600 sq. cm/gm; and
   blending said expansive clinker with a ground cement clinker and with gypsum to form said expansive cement.

2. A method of forming an improved expansive cement as in claim 1 wherein the calcium alumino sulfate compound comprises less than about 40 percent by weight of said expansive clinker, and said expansive clinker comprises from about 4 to about 9% by weight of said cement.

3. A method of forming an improved expansive cement as in claim 2 wherein said gypsum comprises from about 4 to about 10% by weight of said cement.

4. A method of forming an improved expansive cement as in claim 1 wherein said expansive clinker is ground to a surface area of from about 5000 sq. cm/gm to about 7500 sq. cm/gm and said cement clinker has a surface area of from about 3000 sq. cm/gm to about 6200 sq. cm/gm.

5. A method of forming an improved expansion cement comprising:
   separately grinding an expansive clinker containing less than about 40% by weight of a stable calcium alumino sulfate compound until said clinker has a controlled particle size and selected surface area of from about 5000 to about 7500 sq. cm/gm;
   blending said expansive clinker with a ground cement clinker and with gypsum to form said expansive cement, said expansive clinker comprising from about 4 to about 9% by weight of said cement and said gypsum comprising from about 4% to about 10% by weight of said cement.

6. An improved expansive cement comprising a cement clinker, an expansive clinker containing a stable calcium alumino sulfate compound, and gypsum, said cement clinker and said expansive clinker being separately ground to a selected surface area before said clinkers are blended together with said gypsum to form said cement, said ground expansive clinker having a controlled particle size and selected surface area greater than about 4600 sq. cm/gm.

7. An improved expansive cement as set forth in claim 6 wherein the calcium alumino sulfate compound comprises less than about 40% by weight of said expansive clinker, and said expansive clinker comprises from about 4 to about 9% by weight of said cement.

8. An improved expansive cement as set forth in claim 7 wherein said gypsum comprises from about 4 to about 10% by weight of said cement.

9. An improved expansive cement as set forth in claim 6 wherein said expansive clinker is ground to a surface area of from about 5000 sq. cm/gm to about 7500 sq. cm/gm and said cement clinker is ground to a surface area of from about 3000 sq. cm/gm to about 6200 sq. cm/gm.

10. An improved expansive cement comprising a blend of an expansive clinker containing less than about 40% by weight of a stable calcium alumino sulfate compound, a cement clinker, and gypsum which are blended together after said expansive clinker and said cement clinker are separately ground to selected surface areas, said expansive clinker being ground to a surface area of from about 5000 to about 7500 sq. cm/gm and said cement clinker being ground to a surface area of from about 3000 to about 6200 sq. cm/gm, said expansive clinker comprising from about 4 to about 9% by weight of said cement, and said gypsum comprising from about 4 to about 10% by weight of said cement.

11. A method of forming an improved expansive concrete containing a stable calcium alumino sulfate expansive clinker, Portland cement, gypsum, and water, the improvement comprising:
   grinding the expansive clinker in appropriate means separate from the grinding of the Portland cement to produce a controlled particle size without a substantial proportion of finer or coarser particles of expansive clinker and of a selected surface area greater than about 4600 sq. cm/gm.

12. The method of claim 11 wherein the calcium alumino sulfate compound comprises less than 40% by weight of said expansive clinker and said expansive clinker comprises from about four to nine percent by weight of said Portland cement for forming a concrete that compensates for substantially all of the concrete shrinkage.

13. An improved expansive concrete containing a stable calcium alumino sulfate expansive clinker, Portland cement, gypsum, and water, the improvement comprising:
   the expansive clinker, before mixing with at least the Portland cement component of the concrete, having a controlled particle size without a substantial proportion of finer or coarser particles of expansive clinker and of a selected surface area greater than about 4600 sq. cm/gm.

14. The improved expansive concrete of claim 13 wherein calcium alumino sulfate compound comprises less than about 40% by weight of said expansive clinker and said expansive clinker comprises from about 4% to 9% by weight of said Portland cement for forming a concrete that compensates for substantially all the concrete shrinkage.

* * * * *